Nov. 20, 1956  A. H. P. BLOMQVIST ET AL  2,771,573
REMOTE CONTROL FOLLOW-UP SYSTEM FOR POSITIONING
A CONTROLLED UNIT BY A CONTROL UNIT
Filed June 14, 1952
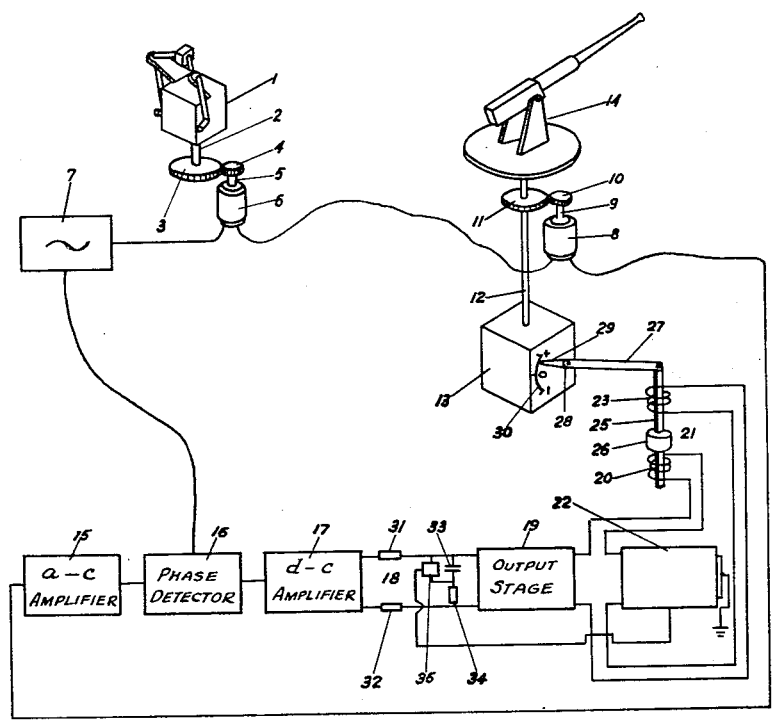
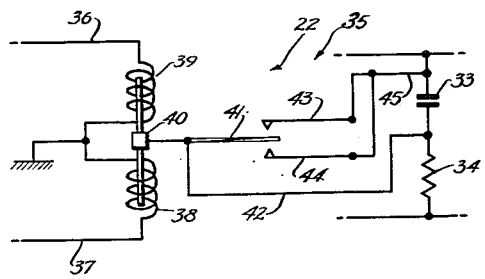
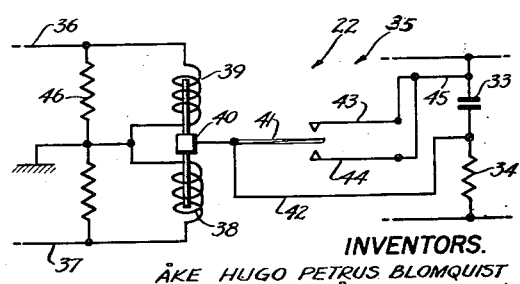
INVENTORS.
ÅKE HUGO PETRUS BLOMQVIST
PER ÅKE LINDEGREN
BY
ATTORNEY.

United States Patent Office 2,771,573
Patented Nov. 20, 1956

2,771,573

REMOTE CONTROL FOLLOW-UP SYSTEM FOR POSITIONING A CONTROLLED UNIT BY A CONTROL UNIT

Åke Hugo Petrus Blomqvist, Johanneshov, and Per Åke Lindegren, Stockholm, Sweden, assignors to Aktiebolaget Bofors, Bofors, Sweden, a Swedish corporation Application June 14, 1952, Serial No. 293,701

Claims priority, application Sweden June 16, 1951

9 Claims. (Cl. 318—30)

This invention relates to follow-up systems for positioning a controlled unit by operation of a control unit situated at a remote point.

While follow-up systems of this kind have many useful applications, a now preferred field of application of the invention is the elevational and lateral aiming of a gun by remote control.

There are known for this purpose remote control systems, the control unit and controlled unit of which are each connected to a signal generating synchronizing device or selsyn unit. Each of these synchronizing devices or selsyn units comprises a stator and a rotor so that when an A.-C. voltage is supplied to the stator an output voltage is produced in the rotor winding the character of which depends obviously upon the angular position of the rotor relative to the stator. By connecting the stators of the two devices and applying an alternating voltage to the rotor of one device a signal is obtained from the rotor of the other device. The form or envelope of this signal depends upon the difference between the position of the controlled unit and the control unit, the position of the latter unit determining the final position desired for the controlled unit. The signals obtained from the rotors of the synchronizer devices, which are in effect signal means, are fed through transmission means to drive means operatively coupled with the controlled unit for moving the same into the desired position. These transmission means generally include A.-C. amplifying means, phase detecting means, D.-C. amplifying means, and regulating or control means for control of the drive means.

As will appear from the previous explanations of the conventional remote control devices, the positioning of the controlled unit is effected by a signal the character or envelope of which is determined by the relative rotor position. An analysis of these signals shows that it may contain pure sine signals both of high and low frequency. Experience shows that these sine signals, particularly those of high frequency, tend to cause disturbances by causing the system to become self-oscillating. Generally, this is the case when the amplification in the system exceeds a certain value. In other words, to avoid self-oscillation of the system, the amplification should not exceed a certain value which value in turn is of course determined by the lay-out of the specific system. With signals of low frequency disturbances in the nature of self-oscillations do not appear so that the amplification can be selected without regard to the aforementioned safe maximum value.

With remote control systems of the general type, herein referred to, it is desirable to use a relatively high amplification irrespectively whether or not the signals are of high frequency or of low frequency since a high amplification is necessary or at least advantageous for a rapid follow-up action of the controlled unit. Obviously, it is desirable to move the controlled unit, such as a gun, as quickly as possible into its end position.

It has already been proposed to associate the D.-C. amplifying means with a filter network having a shunt arm including resistance means and capacitance means connected in series.

A network of this type, when suitably laid out, serves to limit the amplification to the aforementioned permissible maximum value when high frequency signals are generated. However, the difficulty is that the network operates satisfactorily only when the deviations between a momentary position of a controlled unit such as a firearm, and the final position as demanded by the control unit, such as a sighting mechanism, are comparatively small so that the signals received by the controlled unit are comparatively weak. However, in practice it is not always possible to limit the operation of the follow-up system to comparatively small deviations between the positions of the control unit and the controlled unit. As a result, strong signals may be generated which charge the capacitance means of the filter network associated with the D.-C. amplifying means to such an extent that the network cannot function as desired until a certain period of time has elapsed. This is very undesirable for certain applications, for instance a firearm will not reach its intended position until the charge of the capacitance means is dissipated below a value at which the filter network can operate.

Accordingly, one of the main objects of the present invention is to provide means which assure a prompt and immediate operation of the filter network under all conditions, that is independently of the degree of deviation between the momentary position and the final position of the controlled unit.

A more specific object of the invention is to combine control means with a follow-up system of the general type, above referred to, which means are so designed that they render the capacitance means of the filter network automatically inoperative when the strength of the output signals is above a predetermined value.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawing:

Fig. 1 is a diagrammatic view of a follow-up system according to the invention for controlling the azimuth adjustment of a gun.

Fig. 2 is a typical circuit diagram of the control means for controlling the filter network in accordance with the strength of the output signals, and Fig. 3 is a modified circuit diagram of the control means of Fig. 2.

Referring first to Fig. 1 in detail, the follow-up system according to this figure comprises a gun sight 1 of conventional design. This sight constitutes the control unit of the system and includes, among other components, a control bow mounted for pivoting about a horizontal axis and rotation about a vertical axis, pivoting about the horizontal axis serving to vary the elevational position of the gun and rotation about the vertical axis to vary the azimuth or lateral position of the gun. A rotation of the control bow is transmitted by suitable coupling means diagrammatically shown as a shaft 2, gears 3, 4 and a shaft 5 to a synchronizing device 6. This device or selsyn unit is of conventional design and should be visualized as comprising a stator and a rotor each provided with appropriate windings, shaft 5 constituting the rotor shaft so that a rotation of the control bow varies the angular position of the rotor windings relative to the stator windings.

The controlled unit of the system is shown as a gun 14, the platform of which supports a rotary shaft 12 on which is fixed a gear 11. This gear meshes with a gear 10 secured to the rotor shaft 9 of a synchronizing device or selsyn unit 8 similar to the synchronizing device 6. As will be evident, the transmission means between shaft 9 and the gun platform are illustrated in a diagrammatic manner only.

The rotor windings of device 6 are connected to an A.-C. source 7 and the stator windings of the two devices are interconnected. However, it would also be possible to feed the A.-C. potential to the rotor winding of device 8. As will be apparent, the character of the output signals of the devices is determined by the relative position of the rotors of the devices, or in other words by the relative position of control unit 1 and controlled unit 14. It will further be apparent that the two devices function in the nature of an A.-C. selsyn system and any conventional system of this type can be employed, unit 6 being the pilot unit and unit 8 the follower of the system.

Shaft 12 is rotated by means of a rotary drive unit 13. The design of this drive unit does not constitute part of the present invention. It suffices to say that it is reversible and adjustable as to speed. The drive unit is symbolized by a block.

The rotor windings of device 8 are connected to the input side of A.-C. amplifying means 15 of conventional design the output side of which is connected to conventional phase detecting means 16 which are also connected to the A.-C. source 7 so that the same A.-C. potential is fed to the detecting means as is fed to the rotor windings of device 6. The phase detecting means are followed by a D.-C. amplifying means 17, filter network means 18 and an output stage 19 which may include an electronic valve coupling of conventional design. All the aforementioned means are connected in a cascade circuit. The signal generated by a unit 8 and supplied to amplifier 15 is in the nature of a modulated carrier-wave signal. The carrier wave has a frequency of about 400 cycles per second and is generated by unit 7. The modulation signal in the carrier-wave signal is used to control drive unit 13. The carrier wave signal is amplified in amplifier 15 and demodulated in detector 16. Detector 16 supplies to amplifier 17 a signal equal to the modulation signal. The output stage 19 is connected to ground through a control means 22 and a regulating device 21 shown as a differential relay. This relay comprises two coils 20 and 23 of which coil 20 is connected by leads 36 between one terminal of output stage 19, control means 22 and ground and coil 23 is connected by leads 37 between the other terminal of output stage 19, control means 22 and ground. The differential relay further comprises a movable core bar 25 supporting an armature 26 the position of which relative to coils 20 and 23 is controlled by the flow of current through these coils as will be more fully explained hereinafter. The differential relay serves to control the operation of drive unit 13. The operative coupling between the relay and the drive unit is diagrammatically shown as an arm 27 pivoted on one end to bar 25 extending from armature 26 and at the other end to a shaft 28 which should be visualized as controlling the drive unit as to direction and speed in response to a displacement of arm 26 relative to the relay coils. A pointer 29 movable together with shaft 28 and coacting with a scale 30 serves to indicate the speed and rotational direction of the drive unit.

The filter network means 18 are shown as comprising series arms including resistance means 31 and 32 respectively, and a shunt arm including resistance means 34 and capacitance means 33 in series connection.

As previously mentioned, filter network 18 serves to limit the amplification to a permissible maximum value when high frequency signals are generated but becomes temporarily inoperative for this purpose when the signal strength is above a certain maximum value.

Referring now to Fig. 2, this figure shows a circuit diagram of control means 22 and switch means 35 controlled by the control means 22. Before describing Fig. 2 more in detail, it should be pointed out that the circuit diagram of this figure—and also of Fig. 3—is kept as simple as possible to illustrate the operation of the control means. In practice, the control means may be entirely different and much more involved but it is believed that circuits of Figs. 2 and 3 suffice to explain the invention. As will appear from the figures the switch means 35 are connected in shunt with capacitance means 33 and it is only essential for the invention that the switch means short circuit the capacitance means when the signal strength is above the predetermined value.

The circuit diagram of Fig. 2 comprises a differential relay similar to the differential relay 21. The two coils 38 and 39 of the relay are connected in series with coils 20 and 23 of relay 21. As will be apparent from the description of relay 21, armature 40 will be attracted either by coil 38 or coil 39 depending upon the direction of the flow of current. Furthermore, the strength with which armatures 40 will be attracted is a function of the output signals. The differential relay, just described, constitutes the control means 22. The switch means 35 are shown as a make and break switch of the type used in the telephone art. The movable contact of the switch is shown as a contact spring 41 fastened to armature 40 and connected by a lead 42 to one side of capacitor 33. The two contact springs 43 and 44 of the switch are interconnected and connected by a lead 45 to the other side of capacitor 33.

According to the circuit diagram of Fig. 3 the differential relay of control means 22 is connected in parallel to coils 20 and 23 of differential relay 21. For this purpose resistance means 46 are connected in circuit with coils 20 and 23, the midpoint of the resistance means being grounded. Coils 38 and 39 are connected in parallel to each half of resistance means 46.

The operation of the follow-up system, as hereinbefore described, is as follows:

As previously stated, the envelope or character of the output signal of the rotor of the device 8 is a function of the relative position of the rotors of the two devices or, in other words, a function of the deviation of the position of the controlled unit from the position of the control unit. The system is so adjusted, as is well known for the purpose, that the output signal of the rotor of device 8 has a predetermined value when the position of the controlled unit corresponds to the position of the control unit. Generally, the system is set for a zero signal when the positions of the two units are synchronized.

The phase detector 16 to which is fed the same A.-C. potential as to the rotor of device 6 generates a positive D.-C. signal when the output signal from the rotor of device 8 is in phase with the signal from the A.-C. source 7, and a negative D.-C. signal is generated by the detector when the signal from the rotor of device 8 is in opposite phase. The D.-C. signals are then fed to the D.-C. amplifying means 17, the filter network 18 and the output stage 19. Coils 20 and 23 of differential relay 21 are so connected to the D.-C. amplifier 17 that the D.-C. currents flowing through the coils are equal or zero when the positions of the controlled unit and the control unit are equalized, that is, when the gun is in the position demanded by the sight.

Let it now be assumed that detector 16 generates positive direct current. Then, the flow of current through coil 20 is increased and the flow of current through coil 23 is decreased. As a result, armature 26 is attracted by coil 20 thereby actuating drive unit 13 to operate in a direction in which the gun is moved toward a position in which the output signal of the rotor of device 8 becomes zero. The speed with which the drive unit operates and hence the gun is moved depends upon the strength of the output signal from the rotor of device 8. The stronger this signal is the more the armature 26 will be attracted thereby setting the drive unit for a higher speed.

When the current from the detector 16 is negative, armature 26 is attracted by coil 23 and the gun is moved in the opposite direction again with a speed dependent upon the strength of the signal.

As will be apparent, from an examination of Fig. 2, and the previous description, contact spring 41 is in its middle or disengaged position as long as the flow of current through coils 38 and 39 is not sufficient to attract armature 40 into either direction. As a result, capacitor 33 is included in the filter network. However, as soon as either of the coils 38 and 39 attracts armature 40 contact spring 41 engages either contact spring 43 or contact spring 44 thereby short-circuiting capacitor 33 until armature 40 returns into or near its neutral position. The circuit diagram of Fig. 3 operates in basically the same manner so that a further description of this figure does not appear to be essential for the understanding of the invention.

Fig. 1 shows an exemplification of the invention in connection with the azimuth adjustment of a gun. However, it will be apparent, that the same problem exists in connection with the elevational adjustment of the gun and that the same follow-up system in combination with control means according to the invention can be employed to avoid delayed positioning of the gun in elevational direction.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

We claim:

1. A follow-up system for positioning a controlled unit by a control unit situated at a remote point, the said system comprising electric signal means operatively connected with the control unit and the controlled unit and arranged to generate an error signal variable in strength corresponding to the position of the control unit and the controlled unit relative one to the other, amplifying means including filter network means connected in circuit with the signal means for feeding the said error signal to the input side of the amplifying means, reversible drive means operatively connected with the controlled unit for moving the latter, electric regulating means connected in circuit with the drive means for operational and directional control of the same and with the output side of the amplifying means for control of the regulating means by the signal output of the amplifying means as passed by the filter network means, the said filter network means including components sensitive to the signal strength and impeding the normal operation of the system in response to a signal having a strength above a predetermined value, and electric control means responsive to the signal strength and arranged electrically to inactivate the said components in response to a signal above the said predetermined value.

2. A follow-up system for positioning a controlled unit by a control unit situated at a remote point, the said system comprising electric signal means operatively connected with the control unit and the controlled unit and arranged to generate an error signal variable in strength corresponding to the position of the control unit and the controlled unit relative one to the other, amplifying means including filter network means connected in circuit with the signal means for feeding the said error signal to the input side of the amplifying means, reversible drive means operatively connected with the controlled unit for moving the latter, electric regulating means connected in circuit with the drive means for operational and directional control of the same and with the output side of the amplifying means for control of the regulating means by the signal output of the amplifying means, the said filter network means including components sensitive to the signal strength and impeding the normal operation of the system in response to a signal having a strength above a predetermined value, and electromagnetic control means responsive to the signal strength and arranged to short-circuit the said components of the filter network means in response to receiving a signal having a strength above the said predetermined value.

3. A follow-up system as defined in claim 1, wherein the electric control means are connected in series with said regulating means.

4. A follow-up system as defined in claim 1, wherein the electric control means are connected in parallel with said regulating means.

5. A follow-up system as defined in claim 2, wherein the said filter network means comprise a shunt arm including capacitance means and resistance means, said capacitance means constituting the said components capable of impeding a normal operation of the network, and wherein the said electromagnetic means comprise switch means connected in shunt with said capacitance means and arranged to short-circuit said capacitance means in response to a signal having a strength above the said predetermined value.

6. A follow-up system according to claim 5, wherein the said control switch means comprise switch contacts biased into a disengaged position, and wherein said electromagnetic means include coil means arranged to move said switch contacts into the engaged position for short-circuiting said capacitance means thereby varying the characteristics of the filter network means and the influence thereof upon the error signal without blocking the passage of the latter.

7. A follow-up system for positioning a controlled unit by a control unit situated at a remote point, the said system comprising electric signal means operatively connected with the control unit and the controlled unit and arranged to generate an error signal variable in strength as a function of the position of the control unit and the controlled unit relative one to the other, said signal means including selsyn devices operatively connected to the control unit and the controlled unit restively for control thereby, an A.-C. source and phase-detecting means connected in circuit so as to cause the phase-detecting means to generate a positive D.-C. signal when the output signal from the selsyn devices is in phase with the signal from the A.-C. source and a negative D.-C. signal when the said output signal is in opposite phase with the signal from the A.-C. source, D.-C. amplifying means connected in circuit with said phase-detecting means and including filter network means, reversible drive means operatively connected in circuit with the controlled unit for moving the latter, electric regulating means connected in circuit with the drive means for operational and directional control of the latter corresponding to the sign of said D.-C. signal and with the output side of the amplifying means including said filter network means, the said network means including components sensitive to the filter strength and impeding the normal operation of the system in response to a signal of either sign having a strength above a predetermined value, an electric control means responsive to the signal strength connected in circuit with the amplifying means and rendering inactive the said components in response to a signal of either sign above the said predetermined value.

8. A follow-up system according to claim 7, wherein the said regulating means comprise differential relay means including two coil means, one of said coil means being connected for energization by a positive signal and the other for energization by a negative D.-C. signal, energization of one of said coil means effecting actuation of the drive means in one direction and energization of the other of said coil means effecting actuation of the drive means in the opposite direction.

9. A follow-up system according to claim 8, wherein the said electric control means comprise second differential relay means including two coil means, one of said coil means being connected in circuit with one of the coil means of said first differential relay means and the other in circuit with the second coil means of said first relay means, and switch means for shortcircuiting said components, each of the coil means of the second relay means being arranged to be energized in response to a signal of corresponding sign and above a predetermined strength.

References Cited in the file of this patent

UNITED STATES PATENTS

| | | |
|---|---|---|
| 2,421,230 | Agins | May 27, 1947 |
| 2,448,387 | Newell | Aug. 31, 1948 |
| 2,528,486 | Dannant | Nov. 7, 1950 |
| 2,596,698 | Laing et al. | Mar. 13, 1952 |
| 2,668,264 | Williams | Feb. 2, 1954 |
| 2,670,456 | Naylor et al. | Feb. 23, 1954 |
| 2,673,314 | MacCallum | Mar. 23, 1954 |
| 2,679,622 | Deri | May 25, 1954 |